June 30, 1953 — C. HARDEN — 2,643,693

REAMER

Filed Jan. 15, 1951 — 2 Sheets-Sheet 1

CARL HARDEN,
INVENTOR.

BY Lyon & Lyon
ATTORNEYS

June 30, 1953 C. HARDEN 2,643,693
REAMER

Filed Jan. 15, 1951 2 Sheets-Sheet 2

CARL HARDEN
INVENTOR.

BY Lyon&Lyon
ATTORNEYS

Patented June 30, 1953

2,643,693

UNITED STATES PATENT OFFICE 2,643,693

REAMER

Carl Harden, Pasadena, Calif., assignor to Brown Citrus Machinery Corp., Whittier, Calif., a corporation of California Application January 15, 1951, Serial No. 206,010

5 Claims. (Cl. 146—3)

This invention relates to citrus juice extracting devices and has particular reference to reamers for juice extracting machines.

Large quantities of commercially extracted citrus juices are presently being processed and marketed in the form of frozen concentrates. The processing of this relatively new product has given rise to problems not present in the more conventional practice of extracting juice for canning. One of the most troublesome problems has been the controlling of the quantity of peel oil extracted along with the juice. The goal heretofore has been to maintain the oil content of the juice at a minimum, since while the familiar citrus juice flavor is attributed in part to the oil, an overabundance of oil produces a bitter, disagreeable taste. However, in the case of juice destined to be concentrated and frozen, it is desirable to extract a large quantity of oil from the skin or peel along with the juice. This oil is highly volatile and is driven off almost entirely during the evaporation or concentration process. Since a juice with practically no oil content lacks the customary citrus flavor, it is necessary to add to the concentrate, before freezing, a predetermined amount of unconcentrated oil-rich juice to bring the oil content of the finished product up to the desired level. It is often desirable to add only so much of the unconcentrated juice as is absolutely necessary and hence, in order to maintain the quantity of make-up or "cut-back" juice at a minimum, a high oil content is necessary. One of the principal objects of my invention is, therefore, to provide improved means for extracting citrus juices having or mutilating the fruit peel and fibers.

Another object of my invention is to provide means for controlling the oil content of the extracted juice.

Another problem, ancillary to that of oil content, is in regard to the pectin and pectin esterase found in the white rind and in the other fibrous portions of citrus fruit. Pectin is a gell-forming substance and, if present in large amounts in the extracted juice, may form a gell in the concentrate, especially where the sugar content of the juice is high. Tearing or breaking of the peel or fibrous portions of the fruit results in a juice of higher pectin content. It is, then, a further object of my invention to provide improved means for extracting citrus juce without tearing, breaking or mutilating the fruit peel and fibers.

I have found that the above and other objects may be accomplished by changing the design of the conventional reamer used in citrus juice extracting machines. Another object of my invention is to provide a reamer having skin-contacting portions of broad area and having smoothly rounded edges so that considerable pressure may be applied to the fruit in extracting the juice therefrom without breaking or mutilating the fruit peel.

A further object of my invention is to provide a reamer for juice extracting machines which is adapted to extract juice having a minimum amount of pulp and fiber or "rag" extracted therewith.

Other objects and advantages of my invention it is believed will be readily apparent from the following detailed description of preferred embodiments thereof when read in connection with the drawings.

Figure 1:
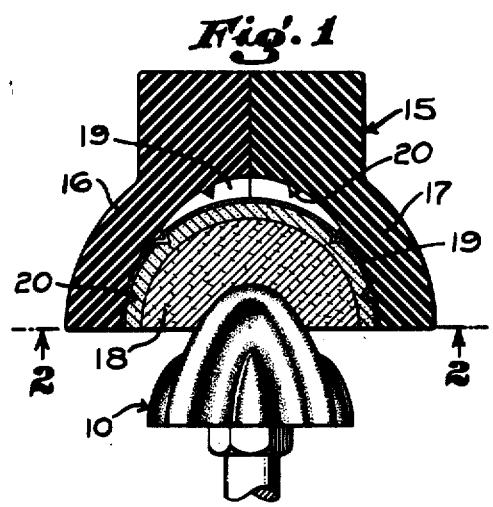
Figure 1 is a side elevation of a preferred embodiment of my invention, illustrating the reamer in position to extract the citrus juice.
Figure 4:
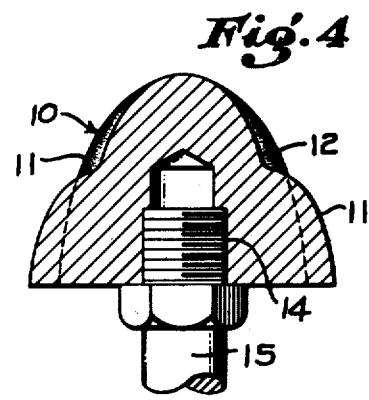
Figure 4 is a sectional elevation taken substantially on the line 4—4 of Figure 3.

Referring now to the drawings, the reamer generally indicated 10 is adapted to be used in a citrus juice extracting machine which may be of the type disclosed in United States Patent 2,199,876, issued May 7, 1940 to William O. Brown. In the machine described therein, the fruit is halved and the halves fed into cups which grasp the fruit with the cut face downwardly and carry it into position for the reaming operation wherein the rotating reamers enter the fruit. A plurality of cups are mounted upon a horizontal cup carrier unit which rotates on a vertical axis. Below the cup carrier unit is a reamer carrier unit which is mounted to rotate upon an inclined axis in synchronism with the cup unit so that each reamer enters a corresponding cup during a portion of its path of travel.

The reamer 10, which embodies the preferred form of my invention illustrated in Figures 1–4, is generally dome-shaped or parabolic in axial cross section and is fluted to provide a plurality of longitudinally extending raised peel-contacting portions or lands 11. These lands curve smoothly into the flutes 12, the edges 13 being rounded so as to present no sharp portions which might tear the skin or peel of the fruit. It will be noted that the lands 11 are of substantial breadth and that the total area of the lands is substantially equal to the area of the flutes 12. The lands 11 substantially define segments of a single surface of revolution, and more specifically, the periphery of any plane cut normal to the axis of the reamer is substantially defined by a plurality of segments of a single circle, which segments lie on the surfaces of said lands. The reamer is provided with a threaded central opening 14 for the reception of the threaded end of a rotating spindle 15.

Figure 2:
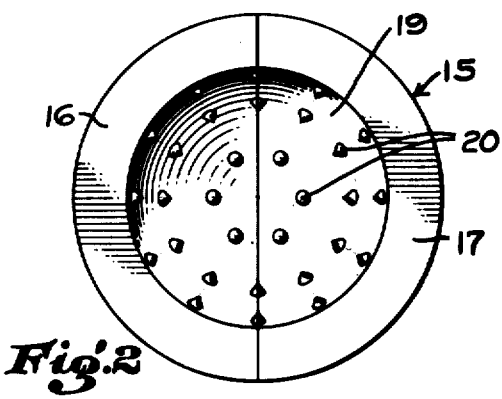
Figure 2 is a sectional elevation taken substantially on the line 2—2 of Figure 1.

In Figures 1 and 2 is illustrated a resilient cup 15 of the general type described above. The cup is split centrally into two portions 16 and 17 which close to grasp a fruit half 18, carry it into position for reaming and which then open to release the reamed peel and to pick up another fruit. The inner face 19 of the cup is provided with a plurality of raised fingers 20 which extend into the outer skin of the fruit half 18 to grip the same, or the inner face 19 may be otherwise surfaced, such as by scoring, to accomplish the same result.

I have found that by providing a reamer of the character described above, that is, with broad lands having smoothly rounded edges, the clearance between the reamer and the cup may be reduced so that the reamer is forced against the peel with considerably greater pressure than has heretofore been possible without tearing or breaking the peel. By means of this great pressure, the oil is squeezed out of the pell, yet the pectin recovery is maintained at a desirably low level since the absence of sharp corners or edges on the reamer prevents mutilation of the peel or cutting loose of fibrous pulpy material. The desired oil content of juice for processing into frozen concentrate is about 0.04–0.08 per cent by volume and I have found that juice having an oil content within this range is readily obtainable with the reamers which embody my invention. Means may be provided to adjust the depth to which the reamer 11 enters the cup 15 so that the pressure may be varied depending upon the peel thickness and upon the oil recovery desired.

Figure 5:
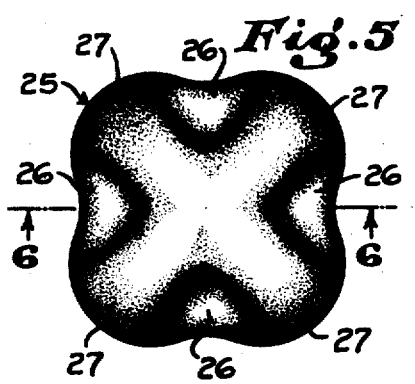
Figure 5 is a top plan view of a modified form of my invention.
Figure 3:
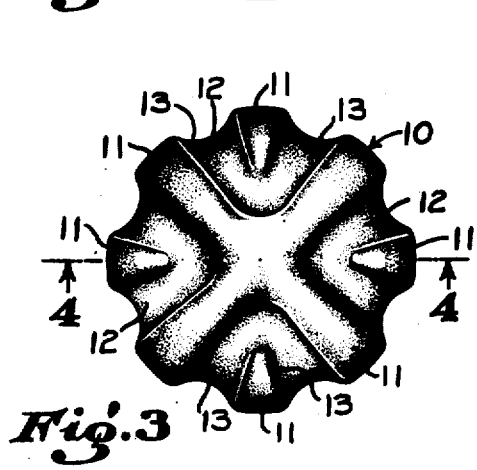
Figure 3 is a top plan view of the reamer illustrated in Figure 1.
Figure 6:
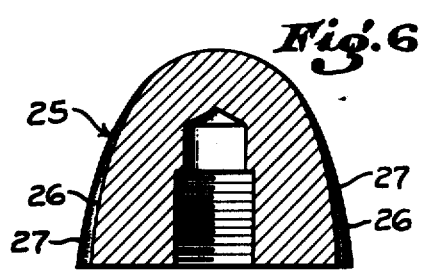
Figure 6 is a sectional elevation taken substantially on the line 6—6 of Figure 5.

A modified form of my invention is illustrated in Figures 5 and 6. The reamer 25 is provided with a smoothly undulating contour having flutes 26 which curve into raised peel-contacting portions or lands 27. Here again the lands 27 are relatively broad and have no sharp edges. The reamer 25 has a central threaded opening 28 so that it may be mounted for rotation on a spindle (not shown). I have found that juice having a very low pulp content may be extracted with this more smoothly-contoured reamer. This relatively pulp-free juice is more easily handled after extraction since it flows freely through the juice lines and does not tend to overload the conventional finishing or straining equipment. Furthermore, it has been possible to extract the juice from overripe fruit with this reamer without disturbing the interior decay which shows up as black areas in the fibrous membranes of the fruit.

The reamer 25 may also be used in extracting juice with a high oil content since the broad smooth lands 27 permit the exertion of great pressure without mutilation of the peel.

Figure 7:
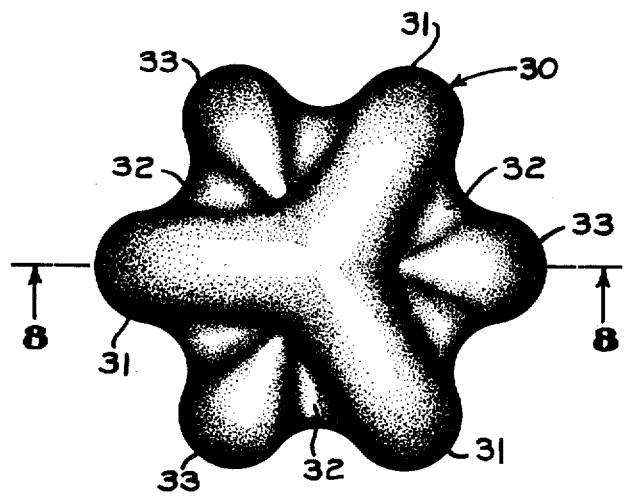
Figure 7 is a top plan view of a further modified form of my invention.
Figure 8:
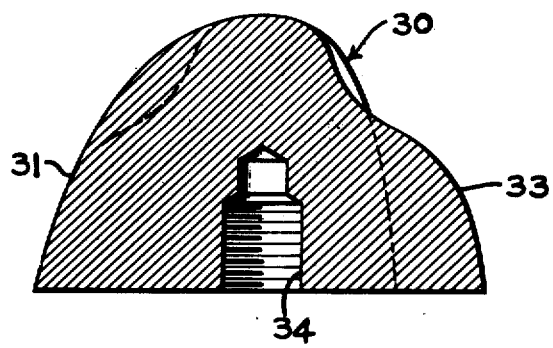
Figure 8 is a sectional elevation taken substantially on the line 8—8 of Figure 7.

A further modified form of my invention is illutrated in Figures 7 and 8. The reamer 30 shown therein is provided with three primary peel-contacting portions or lands 31, each generally semiparabolic in shape and curving smoothly into flutes 32. Interposed between each adjacent pair of primary lands 31 is one of three smoothly-curved secondary lands 33. This reamer is also provided with a central threaded opening 34 for mounting on a rotating spindle (not shown). The reamer 30 has also been found to be extremely effective in extracting juice with a high oil content and a very low content of pulp, pectin and pectin esterase. With this reamer, as well as those described above, the efficiency of the juicing operation is not impaired, as compared with the results obtained with conventional reamers having sharp, narrow lands. The large surface area of the peel-contacting portions of reamers made in accordance with my invention permit the application of relatively high pressure to the fruit, which pressure tends to wring dry the pulp left in the peel, removing substantially all of the juice.

While I have shown and described specific embodiments of my invention, I do not limit myself to the exact details of the constructions set forth, and the invention embraces such changes, modifications and equivalents of the parts and their formation and arrangement as come within the purview of the appended claims.

I claim:

1. A reamer having a substantially paraboloid outer surface, the sides of the paraboloid having a plurality of spaced flutes extending longitudinally and terminating short of the crest of the reamer, the width of the flutes being substantially equal to that of the lands between the flutes, and pairs of said flutes being joined adjacent said crest.

2. In a citrus fruit extracting machine, a generally dome-shaped rotatable reamer having a plurality of fruit peel-contacting lands extending longitudinally thereof and having flutes between said lands merging with the lands in smooth rounded edges, at least certain of said lands intersecting and forming the rounded crest of the dome and comprising arcs of a single surface of revolution and said intersecting lands being of about the same width throughout their length, whereby pressure may be exerted upon the fruit by said reamer to recover, without mutilation of the peel, an appreciable amount of peel oil with the juice.

3. In a citrus fruit juice extracting machine, a rotatable reamer generally parabolic in axial cross-section, said reamer having a plurality of lands extending longitudinally and having flutes between the lands merging with the lands in smooth rounded edges, certain of said lands intersecting to form the rounded dome of the parabola, the outer periphery of any plane cut normal to the axis of said reamer below the dome being defined by a plurality of broad arcs of a single circle, said arcs defining the surfaces of said lands, and the total area of said lands being at least as great as the total area of said flutes, whereby sufficient pressure may be exerted upon the fruit, without mutilation of the peel thereof, to recover an appreciable amount of peel oil along with the citrus juice.

4. In a citrus fruit juice extracting machine, a generally dome-shaped reamer having a plurality of lands and having flutes between said lands merging with the lands in smooth rounded edges, said lands being of generally uniform width and certain only of said lands intersecting to form the rounded crest of the dome, the outer periphery of any plane cut normal to the axis of said reamer below the rounded crest being defined by a plurality of broad arcs of a single circle, said arcs defining the surfaces of said lands, and the total area of said lands being at least as great as the total area of said flutes, whereby sufficient pressure may be exerted upon the fruit, without mutilation of the peel thereof, to recover an appreciable amount of peel oil along with the citrus juice.

5. A rotatable reamer having a substantially paraboloid outer surface, the sides of the paraboloid having a plurality of peel-contacting lands extending longitudinally thereof and having flutes between the lands merging with the lands in smooth rounded edges, said flutes terminating short of the crest of the reamer, the total area of said lands being at least as great as the total area of said flutes, whereby pressure may be exerted upon the fruit by said reamer to recover, without mutilation of the peel, an appreciable amount of peel oil with the juice.

CARL HARDEN.

References Cited in the file of this patent

UNITED STATES PATENTS

| Number | Name | Date |
| --- | --- | --- |
| 226,166 | Fanning | Apr. 6, 1880 |
| 1,981,554 | Johnston | Nov. 20, 1934 |
| 2,332,177 | Smith | Oct. 19, 1943 |
| 2,535,553 | Stoner | Dec. 26, 1950 |

FOREIGN PATENTS

| Number | Country | Date |
| --- | --- | --- |
| 433,861 | France | Sept. 2, 1911 |
| 546,014 | Great Britain | June 24, 1942 |

UNITED STATES PATENT OFFICE
CERTIFICATE OF CORRECTION

Patent No. 2,643,693

June 30, 1953

Carl Harden

It is hereby certified that error appears in the printed specification of the above numbered patent requiring correction and that the said Letters Patent should read as corrected below.

Column 1, line 36, strike out "or mutilating the fruit peel and fibers" and insert instead -- a satisfactorily high oil content --; column 3, line 40, for "pell" read -- peel --.

Signed and sealed this 27th day of May 1958.

(SEAL)
Attest:

KARL H. AXLINE
Attesting Officer

ROBERT C. WATSON
Commissioner of Patents